United States Patent
Calvez et al.

(10) Patent No.: US 6,668,559 B2
(45) Date of Patent: Dec. 30, 2003

(54) FASTENING A CMC COMBUSTION CHAMBER IN A TURBOMACHINE USING THE DILUTION HOLES

(75) Inventors: Gwénaëlle Calvez, Melun (FR); Didier Hernandez, Quiers (FR); Alexandre Forestier, Boissise la Bertrand (FR)

(73) Assignee: SNECMA Moteurs, Paris (FR)

( * ) Notice: Subject to any disclaimer, the term of this patent is extended or adjusted under 35 U.S.C. 154(b) by 50 days.

(21) Appl. No.: 10/161,782

(22) Filed: Jun. 5, 2002

(65) Prior Publication Data

US 2002/0184889 A1 Dec. 12, 2002

(30) Foreign Application Priority Data

Jun. 6, 2001 (FR) ............................................. 01 07366

(51) Int. Cl.⁷ ................................................ F02C 7/20
(52) U.S. Cl. .............................. 60/796; 60/753; 60/800
(58) Field of Search .......................... 60/752, 753, 796, 60/800

(56) References Cited

U.S. PATENT DOCUMENTS

| | | | | |
|---|---|---|---|---|
| 2,509,503 A | | 5/1950 | Huyton | |
| 2,510,645 A | * | 6/1950 | McMahan | 60/796 |
| 4,907,411 A | | 3/1990 | Krüeger | |
| 5,291,733 A | * | 3/1994 | Halila | 60/796 |
| 5,524,430 A | * | 6/1996 | Mazeaud et al. | 60/752 |
| 5,564,271 A | * | 10/1996 | Butler et al. | 60/796 |
| 5,701,733 A | | 12/1997 | Lewis et al. | |
| 6,131,384 A | | 10/2000 | Ebel | |
| 6,182,451 B1 | * | 2/2001 | Hadder | 60/753 |
| 6,334,298 B1 | * | 1/2002 | Aicholtz | 60/796 |
| 6,397,603 B1 | * | 6/2002 | Edmondson et al. | 60/753 |

FOREIGN PATENT DOCUMENTS

GB 2 035 474 6/1980

* cited by examiner

*Primary Examiner*—Michael Koczo
(74) *Attorney, Agent, or Firm*—Oblon, Spivak, McClelland, Maier & Neustadt, P.C.

(57) ABSTRACT

In a turbomachine comprising inner and outer annular shells of metal material containing, in a gas flow direction F: a fuel injection assembly; an annular combustion chamber of composite material having a plurality of air feed orifices in a primary zone and/or in a dilution zone; and an annular nozzle of metal material forming the inlet stage with fixed blades for a high pressure turbine, provision is made for the combustion chamber to be held in position between the inner and outer annular metal shells by means of a plurality of flexible metal tongues having first ends interconnected by respective metal rings fixed securely to said inner and outer annular shells by first fixing means, and second ends fixed securely to the composite material combustion chamber at it air feed orifices by second fixing means.

11 Claims, 3 Drawing Sheets

FASTENING A CMC COMBUSTION CHAMBER IN A TURBOMACHINE USING THE DILUTION HOLES

FIELD OF THE INVENTION

The present invention relates to the specific field of turbomachines, and more particularly it relates to the problem posed by mounting a combustion chamber made of ceramic matrix composite (CMC) type material in the metal chamber casings of a turbomachine.

PRIOR ART

Conventionally, in a turbojet or a turboprop, the high pressure turbine (HPT) and in particular its inlet nozzle, the combustion chamber, and the inner and outer shells (or casings) of said chamber are all made of the same material, generally a metal. Nevertheless, under certain particular conditions of use, implementing very high combustion temperatures, using a metal combustion chamber turns out to be entirely inappropriate from a thermal point of view and it is necessary to use a chamber based on high temperature composite materials of the CMC type. However, the difficulties of working such materials and their raw materials costs mean that their use is generally restricted to the combustion chamber itself, with the inlet nozzle of the high pressure turbine and the inner and outer shells containing the chamber then continuing to be made more conventionally out of metal materials. Unfortunately, metal materials and composite materials have coefficients of thermal expansion that are very different. This gives rise to particularly severe problems of connection with the inner and outer shells and at the interface with the inlet nozzle to the high pressure turbine.

OBJECT AND BRIEF SUMMARY OF THE INVENTION

The present invention mitigates those drawbacks by proposing a mount for the combustion chamber within the casings, which mount has the ability to absorb the displacements induced by the different expansion coefficients of these parts. Another object of the invention is to propose a mount which makes best use of the existing characteristics of the combustion chamber.

These objects are achieved by a turbomachine comprising inner and outer annular shells of metal material containing, in a gas flow direction F: a fuel injection assembly; an annular combustion chamber of composite material having a longitudinal axis and a plurality of oxidizer feed orifices; and an annular nozzle of metal material having fixed blades and forming the inlet stage of a high pressure turbine, wherein said combustion chamber of composite material is held in position between said inner and outer annular metal shells by a plurality of flexible metal tongues, first ends of said tongues being interconnected by respective metal rings fixed securely to each of said inner and outer annular metal shells by first fixing means, and second ends of said tongues being fixed securely to said composite material combustion chamber via at least a fraction of said oxidizer feed orifices by second fixing means, the flexibility of said fixing tongues serving, at high temperatures, to accommodate free displacement in radial and axial directions between said composite material combustion chamber and said inner and outer annular metal shells. The oxidizer feed orifices are constituted by holes for feeding air to a primary zone and/or a dilution zone of said combustion chamber.

With this particular fixed connection structure, the various kinds of wear due to contact corrosion in prior art systems can be avoided. Using the primary holes or the dilution holes (depending on the intended chamber configuration) as anchor points also serves to simplify the connection considerably and to reduce the size thereof. In addition, the presence of flexible tongues taking the place of traditional flanges makes it possible to achieve an appreciable weight saving. Because of their flexibility, these tongues make it easy to accommodate the expansion difference that appears at high temperatures between metal parts and composite parts (by accommodating the displacements due to expansion) while continuing to hold the combustion chamber and keep it properly centered within the annular shells.

The flexible fixing tongues are made of a metal material and the first fixing means are preferably constituted by a plurality of bolts.

In one possible embodiment, said first ends of the tongues are connected by brazing or welding to said rings or else they are formed integrally therewith. When said annular metal shell is made up of two portions, each ring is preferably mounted between connecting flanges between said two portions of said annular metal shell.

In a preferred embodiment, each of said second fixing means comprising a collar inserted in the oxidizer feed orifice of said combustion chamber and is crimped to the second ends of the tongues so as to ensure that said tongues are held against the combustion chamber once the crimping has been achieved.

In an alternative embodiment, said second fixing means comprise a plurality of inserts each comprising two coaxial parts that are fixed one on the other, comprising firstly a collar pressed against a side wall of the combustion chamber and secondly a ring surrounding said collar and pressing the second ends of the tongues against said side wall.

Advantageously, said tongues have respective openings formed close to their second ends in order to improve the feed of oxidizer to said feed orifices.

The stream of gas is preferably sealed between said combustion chamber and said nozzle by a circular "spring-blade" type gasket bearing directly against a downstream end of said combustion chamber which forms a bearing plane for said circular gasket.

BRIEF DESCRIPTION OF THE DRAWINGS

The characteristics and advantages of the present invention appear more fully from the following description made by way of non-limiting indication and with reference to the accompany drawings, in which.

DETAILED DESCRIPTION OF A PREFERRED EMBODIMENT

Figure 1:
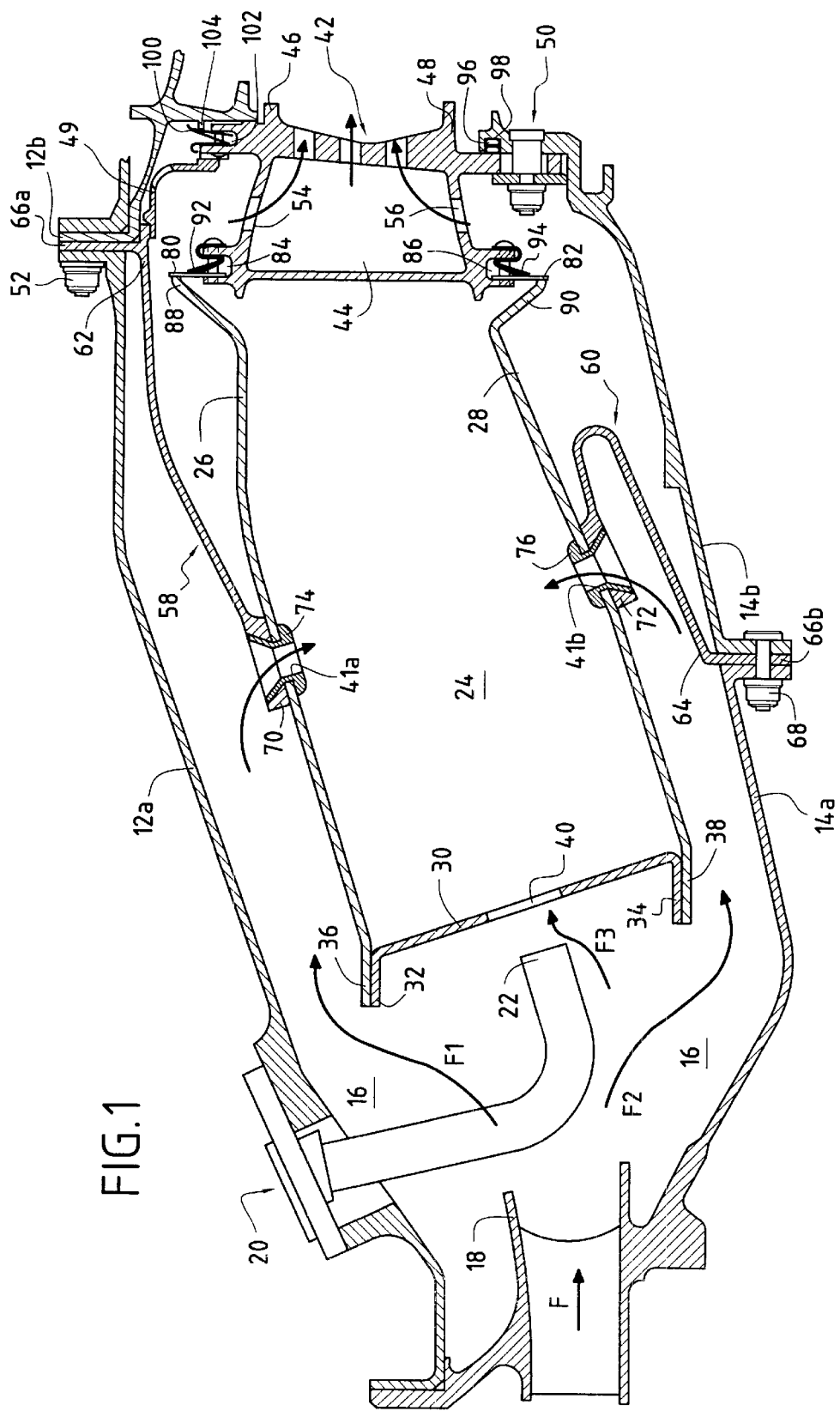
FIG. 1 is an axial half-section of a central zone of a turbomachine constituting a first embodiment of the invention.
Figure 3:
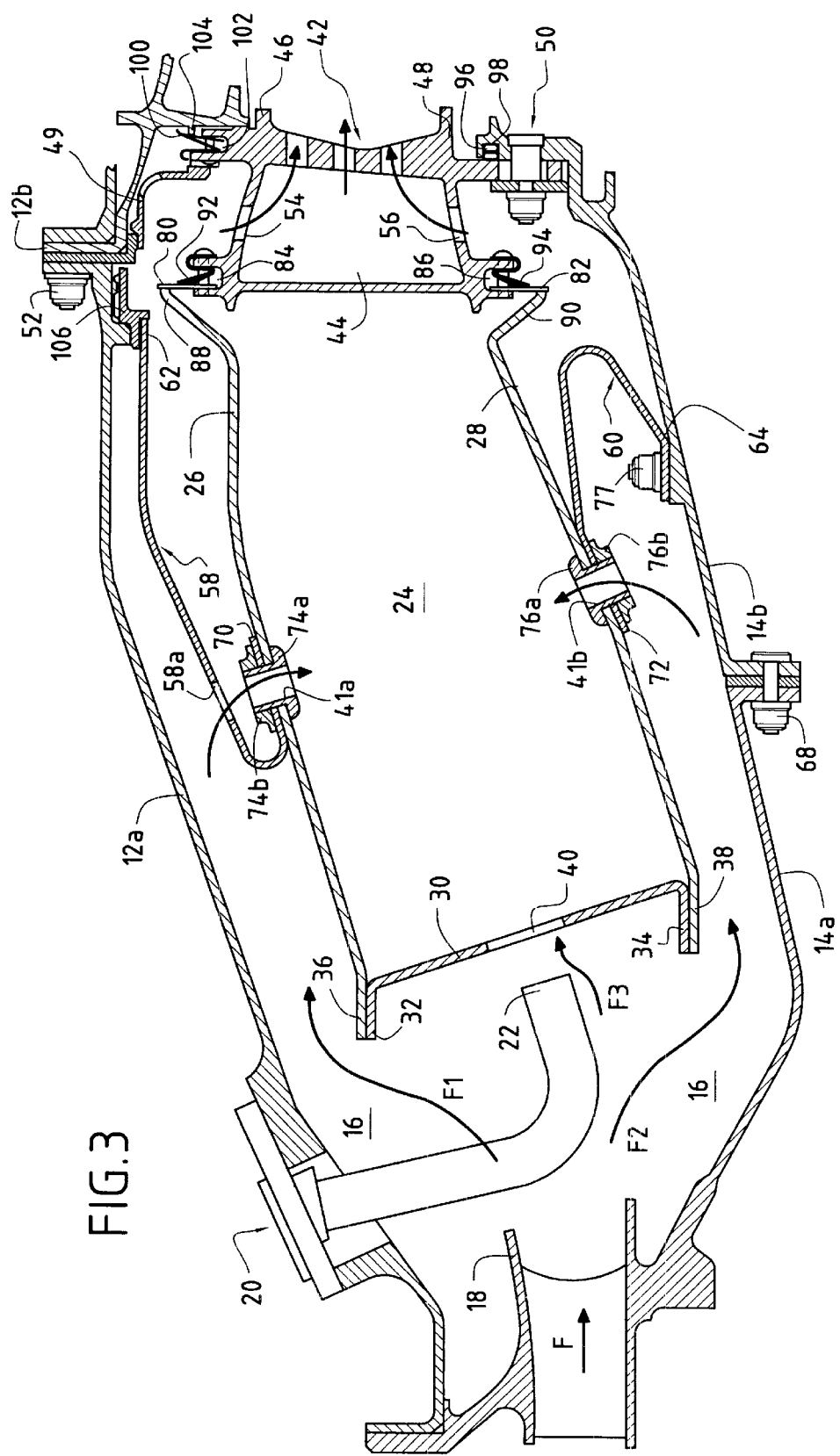
FIG. 3 is a diagrammatic axial half-section of a central zone of a turbomachine constituting a second embodiment of the invention.

FIGS. 1 and 3 are axial half-sections of a central portion of a turbojet or a turboprop (referred to generically in the description below as a "turbomachine"), comprising:

an outer annular shell (or casing) made up of two metal portions 12a, 12b about a longitudinal axis 10;

a coaxial inner annular shell (or casing) likewise made up of two metal portions 14a, 14b; and an annular space 16 lying between the two shells 12a, 12b and 14a, 14b receiving the compressed oxidizer, generally air, coming from an upstream compressor (not shown) of the turbomachine via an annular diffusion duct 18 and defining a general gas flow direction F.

In the gas flow direction, this space 16 contains firstly an injection assembly comprising a plurality of injection systems 20 regularly distributed around the duct 18 and each comprising a fuel injection nozzle 22 fixed on an upstream portion 12a of the annular outer shell (in order to simplify the drawings, the mixer and the deflector associated with each injection nozzle have been omitted), followed by a combustion chamber 24 of composite material, e.g. of the CMC type, comprising an outer axially-extending side wall 26 and an inner axially-extending side wall 28, both side walls being coaxial about the axis 10, and a transversely-extending end wall 30 likewise made of a high temperature composite material of the CMC type or the like (e.g. carbon), said end wall having margins 32 and 34 fixed to the upstream ends 36, 38 of the side walls 26, 28, e.g. by flat-headed refractory or metal bolts, said end wall 30 being provided with through orifices 40 for enabling fuel and a portion of the oxidizer to be injected into the combustion chamber 24, and the side walls further including a plurality of oxidizer feed orifices 41a, 41b, and finally an annular nozzle 42 of metal material forming an inlet stage for a high pressure turbine (not shown) and conventionally comprising a plurality of fixed blades 44 mounted between an outer circular platform 46 and an inner circular platform 48.

The nozzle is fixed to a downstream portion 14b of the inner annular shell of the turbomachine via first releasable fixing means, preferably constituted by a plurality of bolts 50, while also resting against support means 49 secured to the outer annular shell of the turbomachine.

The compressed oxidizer leaving the diffusion duct 18 is split into a plurality of flows including at least flows F1, F2 flowing on either side of the combustion chamber 24 (together with a central flow F3 that mixes with the fuel in order to be injected into the chamber). Each oxidizer flow F1, F2 is subsequently inserted into the chamber via the feed orifices 41a, 41b, or else is directed to through orifices 54, 56 provided through the outer and inner metal platforms 46 and 48 of the nozzle 42 to cool the fixed blades 44 of the nozzle at the inlet to the high pressure turbine rotor.

In the invention, the combustion chamber 24 which has a thermal expansion coefficient that is very different from that of the other parts making up the turbomachine which are themselves made of metal, is held securely in position between the inner and outer annular shells by a plurality of flexible tongues 58, 60 that are regularly distributed around the combustion chamber. A first fraction of these fixing tongues (see the tongue referenced 58) is mounted between the outer annular shell 12a, 12b and the outer side wall 26 of the combustion chamber, and a second fraction of the tongues (such as the tongue 60) is mounted between the inner annular shell 14a, 14b and the inner side wall 28 of the combustion chamber.

Figure 1A:
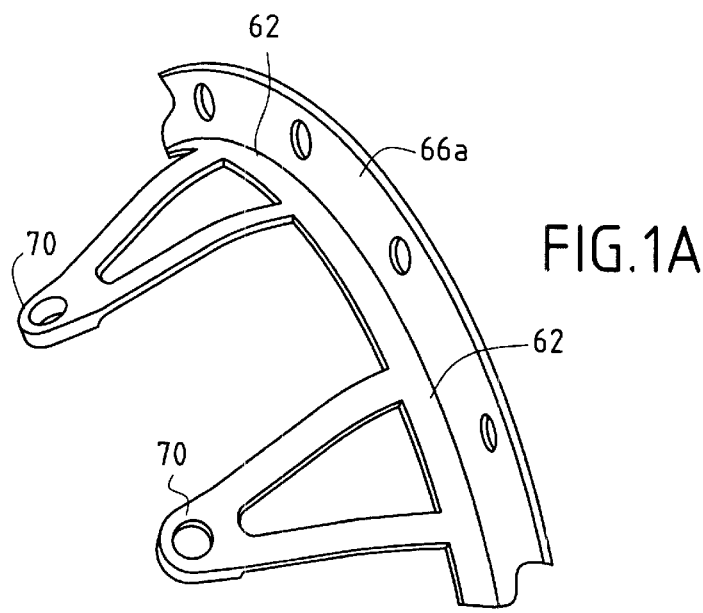
FIGS. 1A and 1B show examples respectively of a flexible fixing tongue for the outer wall and for the inner wall of the combustion chamber.
Figure 1B:
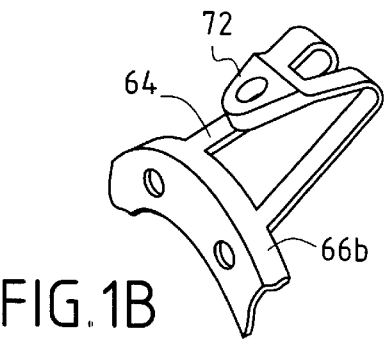

As shown in FIGS. 1A and 1B, each flexible fixing tongue of metal material is substantially triangular in shape, being brazed or welded via its base 62; 64 to a metal ring 66a, 66b or that is formed integrally therewith. The ring is secured to one or the other of the outer or inner metal annular shells 12 or 14 by first fixing means 52, 68. The vertex 70; 72 of the tongue is secured to the outer or inner side walls 26 or 28 of the composite material combustion chamber via all or some of the oxidizer feed orifices 41a, 41b using second fixing means 74, 76. These oxidizer feed orifices can be dilution holes and/or primary holes for feeding the combustion chamber with air (particularly in a so-called "short" combustion chamber configuration). The number of tongues is proportional to the number of these holes and this number is generally equal to the number of injection nozzles or equal to a multiple of said number (for example 60 tongues will be used if the chamber has 20 injection nozzles each having three dilution holes).

FIG. 1 shows a first embodiment of the invention in which the vertices 70, 72 forming second ends of the tongues are fixed respectively on the outer and inner side walls 26 and 28 of the combustion chamber by being crimped by means of collars 74, 76 inserted from the hearth side of the combustion chamber thorough respective oxidizer feed orifices 41a, 41b and serving to hold the tongue against the combustion chamber wall once crimping has been performed. The real diameter of the feed orifice (dilution hole or primary hole) is matched by the collar whose outer edges (on the hearth side of the chamber) are rounded so as to avoid catching flames.

The bases 62, 64 forming first ends of the tongues as interconnected by the ring 66a, 66b are preferably held between existing flanges for connecting together the upstream and downstream portions of the inner and outer annular shells 14a, 14b and 12a, 12b, and are held securely by fixing means 52, 68, preferably of the bolt type.

Figure 2:
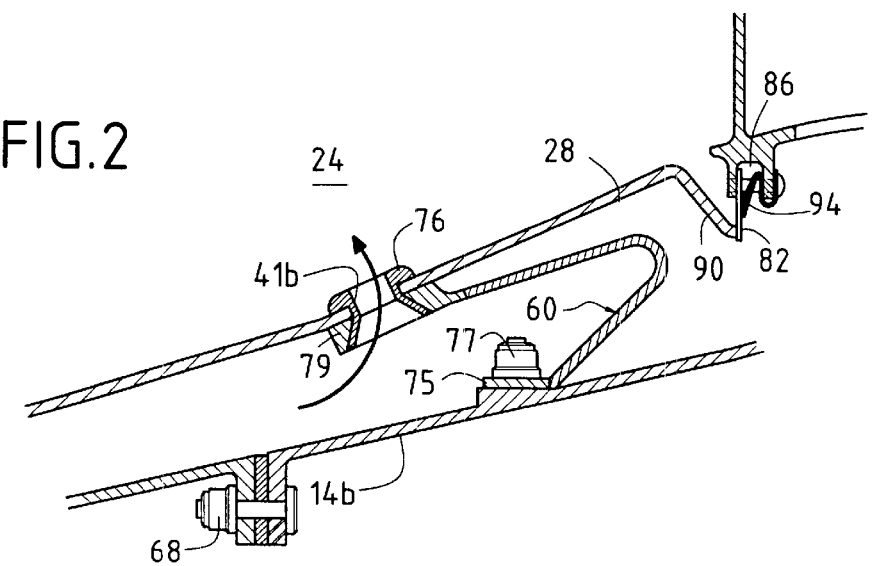
FIG. 2 is a view showing a portion of FIG. 1 on a larger scale using an alternative connection configuration.

In a variant shown in FIG. 2, the tongues 60 for fixing to the inner annular shell 14b are in the form of thin metal strips (of optionally constant width) each having a first end welded to a metal ring 75 which is not clamped between flanges but instead is fixed directly to the downstream portion 14b of the inner annular shell by fixing means 77, e.g. of the bolt type. Advantageously, and in order to facilitate mounting, the second ends of these tongues are constituted by metal pieces 79.

The gas stream is sealed between the combustion chamber 24 and the nozzle 42 by providing circular "spring-blade" gaskets 80, 82 mounted in respective grooves 84, 86 in the outer and inner platforms 46, 48 of the nozzle and bearing directly against downstream ends 88, 90 of the combustion chamber forming bearing planes for said gasket. Each gasket is pressed against the corresponding end of the chamber by a resilient element of the circular spring-blade type 92, 94 which is fixed to the nozzle. In a variant (not shown), the gasket need not bear directly against the downstream end of the combustion chamber but instead bears against a ring of composite material fitted to said downstream end, conventionally by brazing or less conventionally by an implanting technique known by the term "pin'sage".

The flow of gas between the combustion chamber and the turbine is sealed firstly by an omega type circular gasket 96 mounted in a circular groove 98 in a flange of the inner annular shell 14 in direct contact with the inner circular platform 48 of the nozzle, and secondly by another circular gasket 100, of the "spring-blade" type mounted in a circular groove 102 of the outer circular platform 46 of the nozzle having one end in direct contact with a circular rim 104 of the downstream portion 12b of the outer annular shell.

In a second embodiment of the invention, as shown in FIG. 3, the second ends of the tongues 70, 72 are fixed respectively to the outer and inner side walls 26, 28 of the combustion chamber via inserts each comprising two coaxial portions fixed to each other (advantageously by brazing or welding), one comprising a collar 74*a*, 76*a* pressed against the hearth side of the wall and the other in the form of a ring 74*b*, 76*b* surrounding the collar and pressing the eyelet-forming second end of the tongue against the wall. As in the preceding embodiment, the real diameter of the dilution hole or of the primary hole is taken up by the collar whose outer edges are rounded so as to avoid catching flames.

Advantageously, the tongue 58 can have an opening 58*a* formed close to the second end 70 of the tongue in register with the injection orifice 41*a* so as to make it easier to feed after assembly. In addition, in the example shown, the first ends of this tongue are no longer welded to a ring mounted between flanges (as shown in FIG. 1) but they are brazed to keying means 106 secured to the outer annular shell 12.

In all of the above configurations, the flexibility of the fixing tongues serves to accommodate the thermal expansion difference that appears at high temperatures between the composite material combustion chamber and the annular metal shells, while ensuring that the combustion chamber is properly held and positioned. In addition, the use of oxidizer feed orifices as anchor points for these tongues facilitates assembly and minimizes bulk generally.

What is claimed is:

1. A turbomachine comprising inner and outer annular shells of metal material containing, in a gas flow direction F: a fuel injection assembly; an annular combustion chamber of composite material having a longitudinal axis and a plurality of oxidizer feed orifices; and an annular nozzle of metal material having fixed blades and forming the inlet stage of a high pressure turbine, wherein said combustion chamber of composite material is held in position between said inner and outer annular metal shells by a plurality of flexible metal tongues, first ends of said tongues being interconnected by respective metal rings fixed securely to each of said inner and outer annular metal shells by first fixing means, and second ends of said tongues being fixed securely to said composite material combustion chamber via at least a fraction of said oxidizer feed orifices by second fixing means, the flexibility of said fixing tongues serving, at high temperatures, to accommodate free displacement in radial and axial directions between said composite material combustion chamber and said inner and outer annular metal shells.

2. A turbomachine according to claim 1, wherein oxidizer feed orifices are constituted by holes for feeding air to a primary zone and/or to a dilution zone of said combustion chamber.

3. A turbomachine according to claim 1, wherein said first ends of the tongues are connected by brazing or welding to said metal ring.

4. A turbomachine according to claim 1, wherein said first ends of the tongues are formed integrally with said metal ring.

5. A turbomachine according to claim 1, wherein said first fixing means are constituted by a plurality of bolts.

6. A turbomachine according to claim 1, wherein each of said annular shells is made up of two portions, said metal ring being mounted between flanges for interconnecting said two portions.

7. A turbomachine according to claim 1, wherein each of said second fixing means comprises a collar inserted in each oxidizer feed orifice of said combustion chamber and crimped onto the second ends of the tongues to hold said tongues against the combustion chamber once crimping has been performed.

8. A turbomachine according to claim 1, wherein said second fixing means comprise a plurality of inserts each made up of two coaxial portions that are fixed to each other, comprising firstly a collar bearing against a side wall of the combustion chamber and secondly a ring surrounding said collar and pressing said second ends of the tongues against said side wall.

9. A turbomachine according to claim 1, wherein each of said tongues comprises an opening formed close to its said second end in order to improve feed via said oxidizer feed orifices.

10. A turbomachine according to claim 1, wherein sealing for said stream of gas is provided between said combustion chamber and said nozzle by a "spring-blade" circular gasket bearing directly against a downstream end of said combustion chamber which forms a bearing plane for said circular gasket.

11. A turbomachine according to claim 1, wherein sealing for said stream of gas is provided between said combustion chamber and said nozzle by a "spring-blade" circular gasket bearing against a ring of composite material fitted to said downstream end by brazing or by being implanted therein.

* * * * *